United States Patent
Smeenge, Jr. et al.

(10) Patent No.: US 6,535,379 B1
(45) Date of Patent: Mar. 18, 2003

(54) COMPUTER WITH EXCHANGEABLE FRONT BEZEL

(75) Inventors: James G. Smeenge, Jr., Campbell, CA (US); Peter K. Lee, San Jose, CA (US); James Huang, Hsin Tien (TW); Shan-Wen Mao, Lu-Jou (TW)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/586,650

(22) Filed: Jun. 1, 2000

(51) Int. Cl.⁷ ................................................ G06F 1/16
(52) U.S. Cl. ..................... 361/683; 361/679; 361/724
(58) Field of Search ............................ 361/679–686, 361/724–727

(56) References Cited

U.S. PATENT DOCUMENTS 5,349,132 A * 9/1994 Miller et al. .............. 174/35 R
5,604,662 A * 2/1997 Anderson et al. ............ 361/685
5,997,115 A * 12/1999 Radloff et al. .............. 312/222
6,053,586 A * 4/2000 Cook et al. .............. 312/223.2

OTHER PUBLICATIONS

U.S. patent application Ser. No. 09/580,393 filed May 26, 2000 for Computer With Removable Panels of Elizabeth B. Diaz, Kun–Chi Hsieh, and Bo Siu–Fai (Attorney Docket No. 10004255–1).

* cited by examiner

Primary Examiner—Darren Schuberg
Assistant Examiner—Yean-Hsi Chang

(57) ABSTRACT

A computer enclosure assembly comprising of a generally box shaped computer chassis having a plurality of face portions including a first face portion, a first panel member removably mounted on the first face portion; and a latch assembly comprising a first latch portion on the chassis and a second latch portion on the first panel member. One of the first and second latch portions is trippingly deflectable to disengage the first latch portion from the second latch portion through application of pressure to a trip area, the trip area being hidden from view.

1 Claim, 13 Drawing Sheets

COMPUTER WITH EXCHANGEABLE FRONT BEZEL

FIELD OF THE INVENTION

The present invention relates generally to computers and, more particularly, to a computer having a removable/replaceable bezel.

BACKGROUND OF THE INVENTION

When personal computers were introduced in the late 1970's and early 1980's consumers considered them to be strictly utilitarian devices and their appearance reflected this sentiment. Most computers were housed in white, gray or beige, box-shaped, sheet metal housings. A few buttons and a floppy disk insertion slot were typically provided on a similarly colored, flat, front panel.

In the last few years industrial design has become extremely important to the computer industry. For computers directed at the home consumer market, sleek housings highlighted with brightly colored plastic panels have become the norm. Peripheral devices are often sold having replaceable colored panels so that a computer owner can "customize" the peripheral by installing a colored panel to match the colored panel on his/her computer. Applicants perceive a need for a computer of a type that would allow the computer owner to customize the appearance of the computer itself. This could be done with different colored replacement panels, particularly front panels or bezels since the front bezel is the most visible area on the computer.

However there are drawbacks to providing a computer front bezel that is easily removable and replaceable. To begin with the front bezel is typically the region of the computer that experiences the most physical contact with a user as a result of button actuation, media insertion/removal, etc. Also the front bezel is typically one of the largest housing components and as a result of this size, any shifting or twisting of the bezel relative the rest of the housing structure can create noticeable gaps in seams or other regions where the bezel engages other portions of the computer. Another problem that exists with an easily removable bezel, applicants believe, is that it may become a target for theft or mischief. Therefore, applicants believe, any removable bezel assembly must be constructed and arranged in a manner that enables a bezel to be accurately located on the computer and reliably affixed thereto in a manner which discourages theft or mischief.

So far as applicants are aware, prior to applicant's invention personal computers have not been provided with readily removable/replaceable front bezels which allow computer purchasers to themselves easily customize their computers with replacement front bezels of different colors or different exterior designs. (As used herein a "readily-removable/replaceable bezel" is one which is lockingly attachable to a computer and which is unlatchingly removable and latchingly replaceable with a bezel of identical structure by a typical lay person with no special technical expertise and without specialized tools in less than 30 seconds.)

SUMMARY OF THE INVENTION

The present invention is directed to a computer enclosure assembly which includes a readily-removable/replaceable bezel that enables a, computer owner to easily change the appearance of his/her computer by replacing the bezel with one of a different color and/or different surface appearance.

Thus the invention may comprise a computer enclosure assembly including a generally box shaped computer chassis having a plurality of face portions including a first face portion. A first panel member is removably mounted on the first face portion. The enclosure assembly with a latch assembly with a first latch portion on the chassis and a second latch portion on the first panel member. One of the first and second latch portions is trippingly deflectable to disengage the first latch portion from the second latch portion through application of pressure to a trip area. The trip area is hidden from view.

The invention may also comprise a method of removing a computer panel including: applying pressure to a hidden trip area on a deflectable member; and removing the panel.

The invention may also comprise a method of replacing a computer front panel including: pivotally lifting a computer top panel; inserting an elongated tool into a hole in a portion of computer chassis exposed by lifting the top panel; pushing the elongated tool against a deflectable member associated with the front panel; pivotally displacing and liftingly removing the computer front panel; placing a replacement front panel in engagement with a housing pivot structure; and pivoting the replacement front panel into latching engagement with the computer chassis.

The invention may also comprise a computer including a computer enclosure assembly and a readily-removable/replaceable front bezel fixedly mounted on a front portion of the computer enclosure assembly.

DETAILED DESCRIPTION

In General

Figure 1:
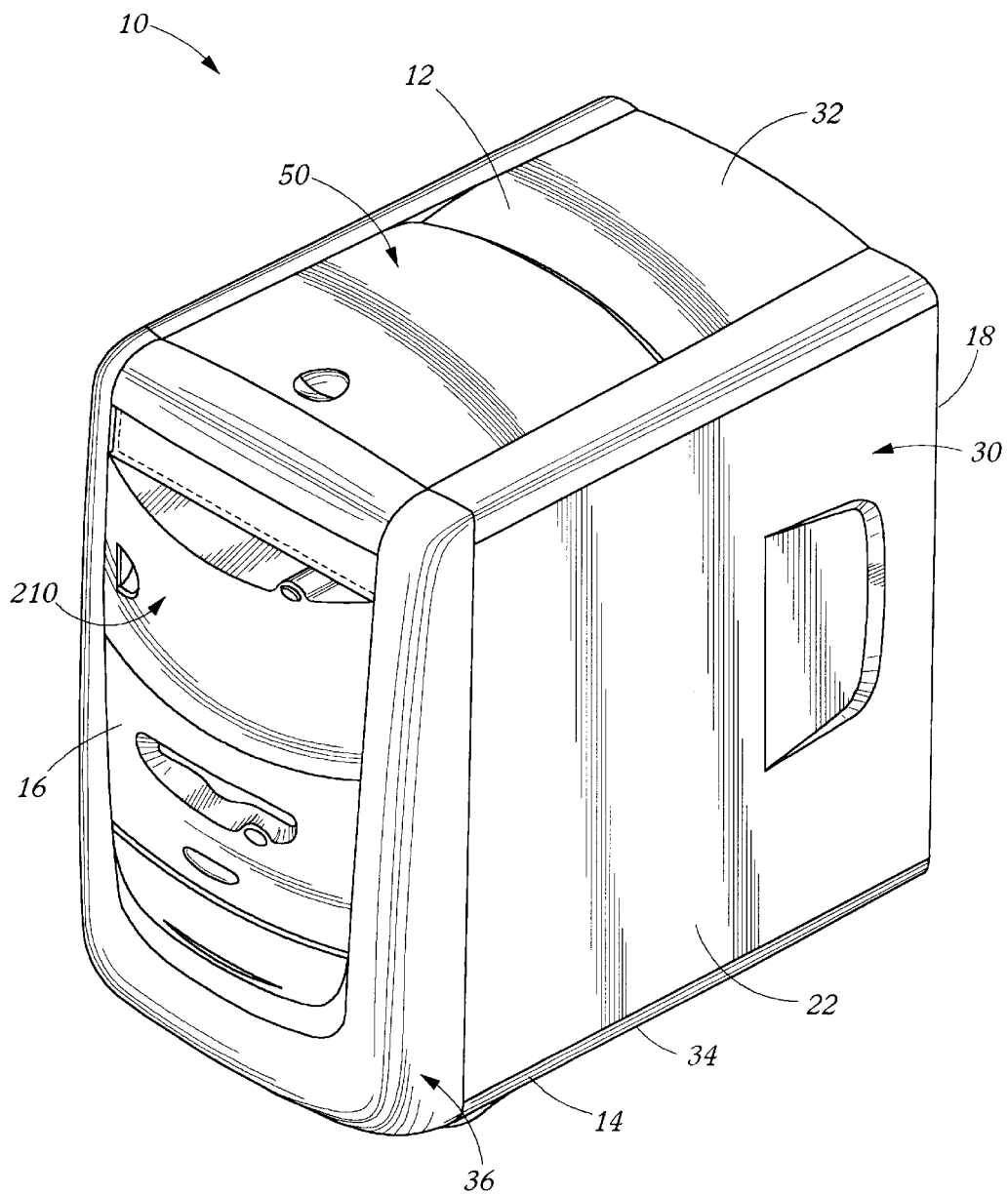
FIG. 1 is a perspective view of a computer.

The drawing figures, in general, disclose a computer enclosure assembly including a generally box shaped computer chassis 30, 32, 34, 36 having a plurality of face portions including a first face portion 36. A first panel member, which may be a front bezel 210, is removably mounted on the first face portion 36. A latch assembly is provided which includes a first latch portion 96, 98 on the chassis and a second latch portion 232 on the first panel member 210. One of the first and second latch portions 96, 98 and 232 may be deflected to disengage the first latch portion from the second latch portion 232. The deflection is produced by applying pressure to a trip area 241. The trip area is hidden from view when the computer is in the normal assembled state shown in FIG. 1. The trip area may be accessed by lifting a top door 50. Pressure may be applied to the trip area with a ball point pen or straightened paper clip or other small diameter member.

Computer Chassis Assembly

Figure 2:
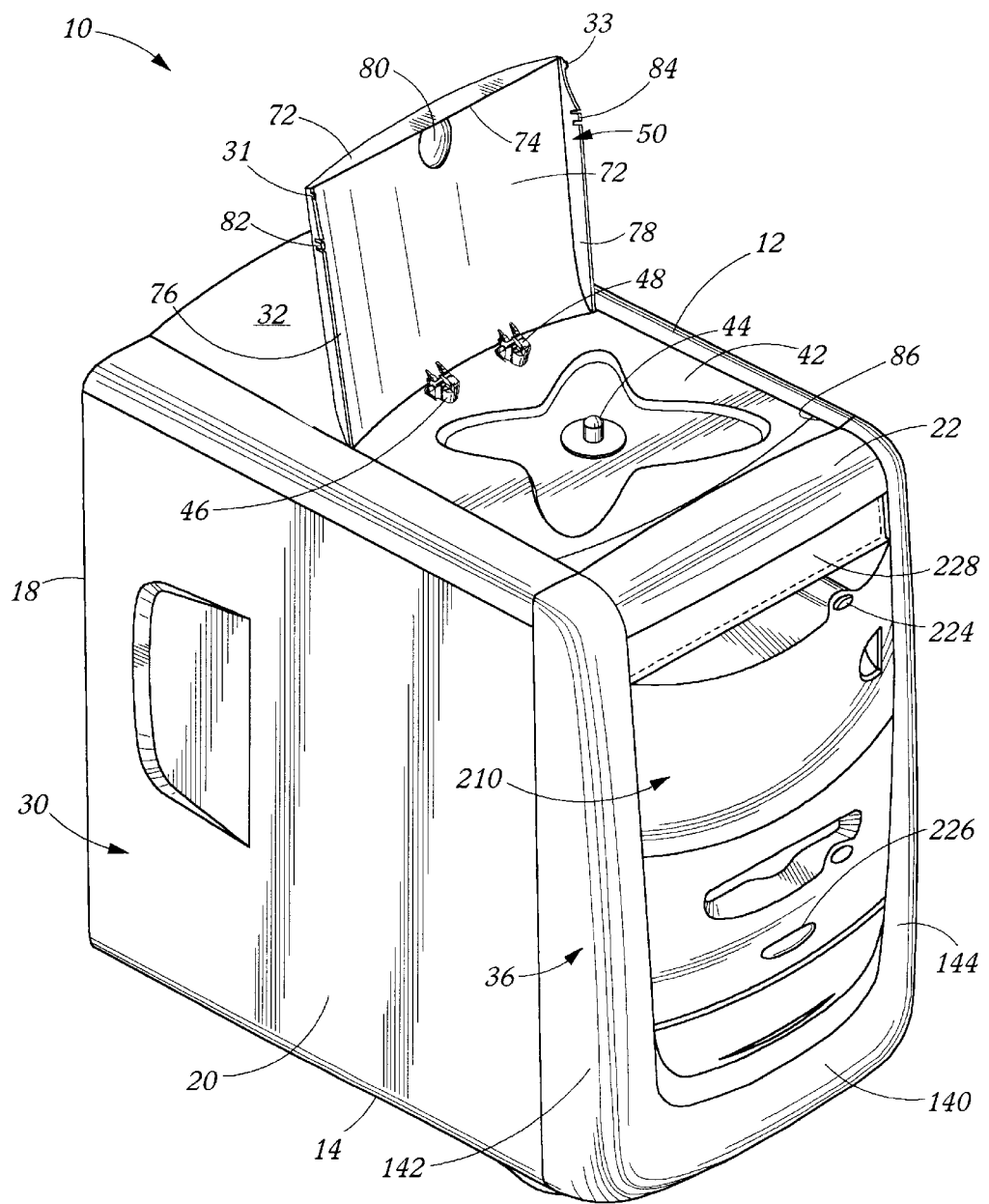
FIG. 2 is a perspective view of the computer of FIG. 1 with a top door in an open position.

FIGS. 1 and 2 disclose a computer 10 having an enclosure assembly with top portion 12, bottom portion 14, front portion 16, rear portion 18, left side portion 20 and right side portion 22.

The computer may comprise a rectangular box shaped sheet metal housing 30 provided with a fixedly attached, plastic (e.g., ABS plastic) top panel member 32, bottom plastic panel member 34 and front plastic panel member 36. The housing 30 and relatively permanently attached panel member 32, 34, and 36 are referred to herein as the computer "chassis assembly" or simply "chassis".

Top Panel Member and Top Door

Figure 3:
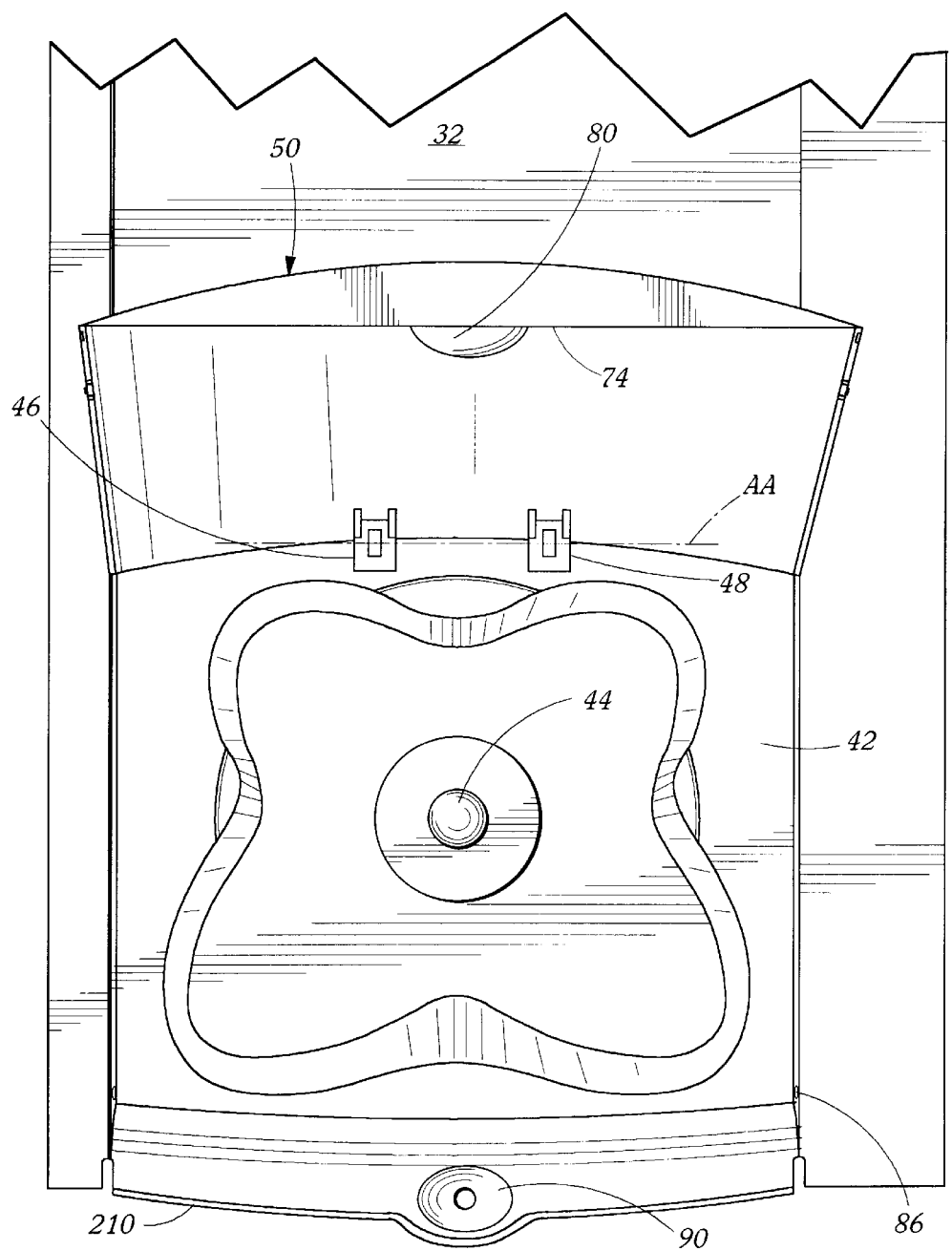
FIG. 3 is a top plan view of the computer of FIG. 1 with the top door in an open position.
Figure 4:
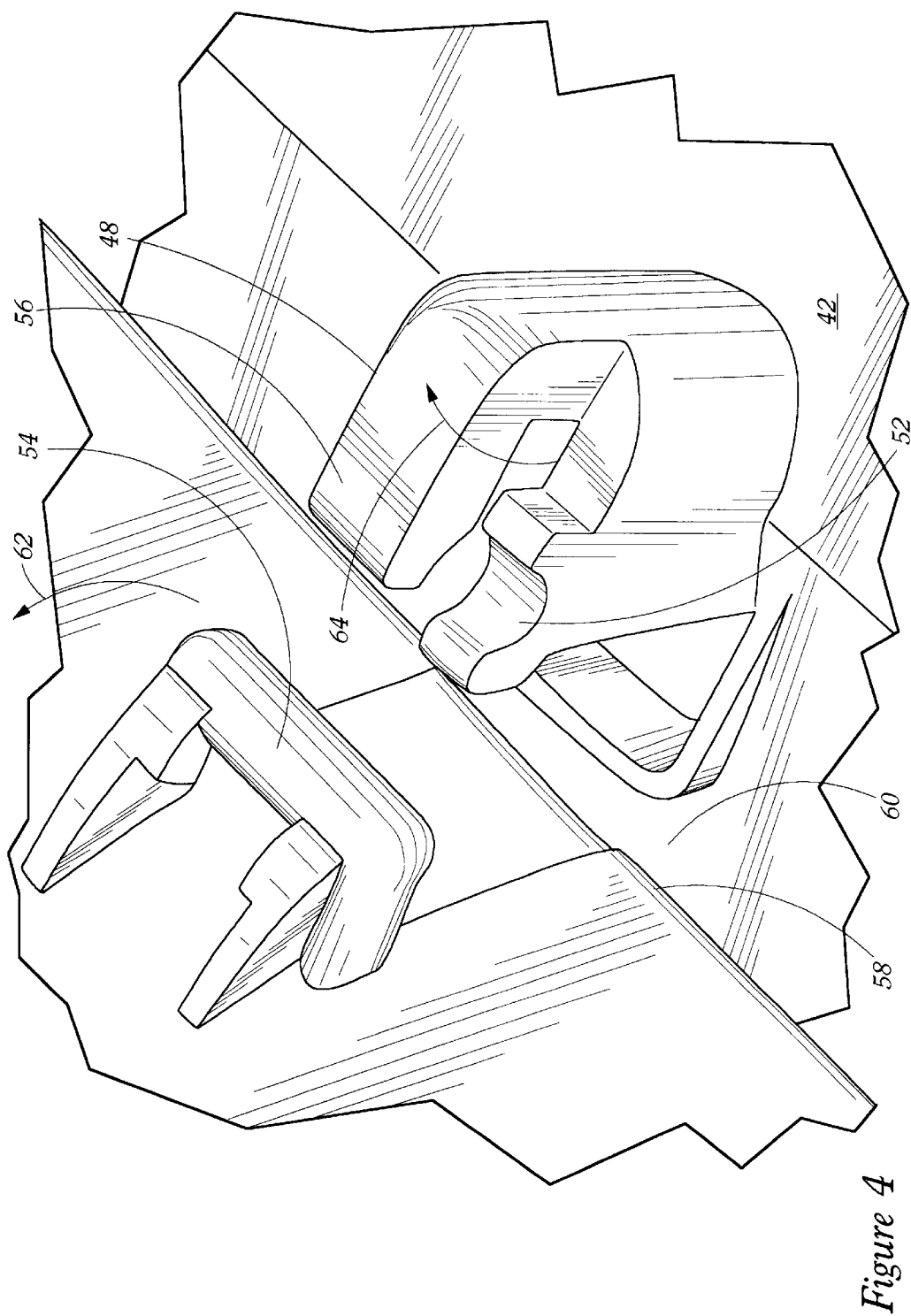
FIG. 4 is a perspective detail of a top door hinge assembly.

The top panel member 32 has a top surface 40 which may have a recessed portion 42 thereon. An upstanding vertical post 44 may be positioned at the center of the recessed portion. The post is adapted for holding optical disks such as CDs and DVDs. The recessed portion also may have two other post members 46, 48 which are adapted to pivotally mount a top door (panel) member 50 about a horizontal pivot access AA, FIG. 3. The pivotal mounting structure of the post may be a snap-off/snap-on mounting structure of the type illustrated in FIG. 4. this structure includes having an arcuate, upwardly facing surface 52 provided at a top portion of the post which is adapted to rotably support a cylindrical pivot member 54 integrally formed with door 50. The post has an upper, resiliently defectable arm portion 56 adapted to engage cylindrical portion 54 to retain it in contact with arcuate portion 52 and thus maintain door 50 about pivot access AA. However, pivotal displacement of door 50 rearwardly beyond the position illustrated in FIG. 2 will cause a lower edge portion 58 of the door to contact surface 60 adjacent the post 46, 48 which in turn causes any further rotation of the door to occur along an axis defined by edge 58 at its point of contact with surface 60. Such further rotation causes cylindrical member 54 to be lifted up and out of its engagement with arcuate portion 52 and arm portion 56 as generally illustrated in FIG. 4 at 62. The defectable movement of arm portion 56 is indicated at 64. The cylindrical portion 54 may be snappingly reinserted into engagement with arcuate surface 52 by urging the surface of cylindrical portion 54 forwardly and downwardly against the terminal end of arm portion 56. Snap-on/snap-off doors are known in the art.

Figure 12:
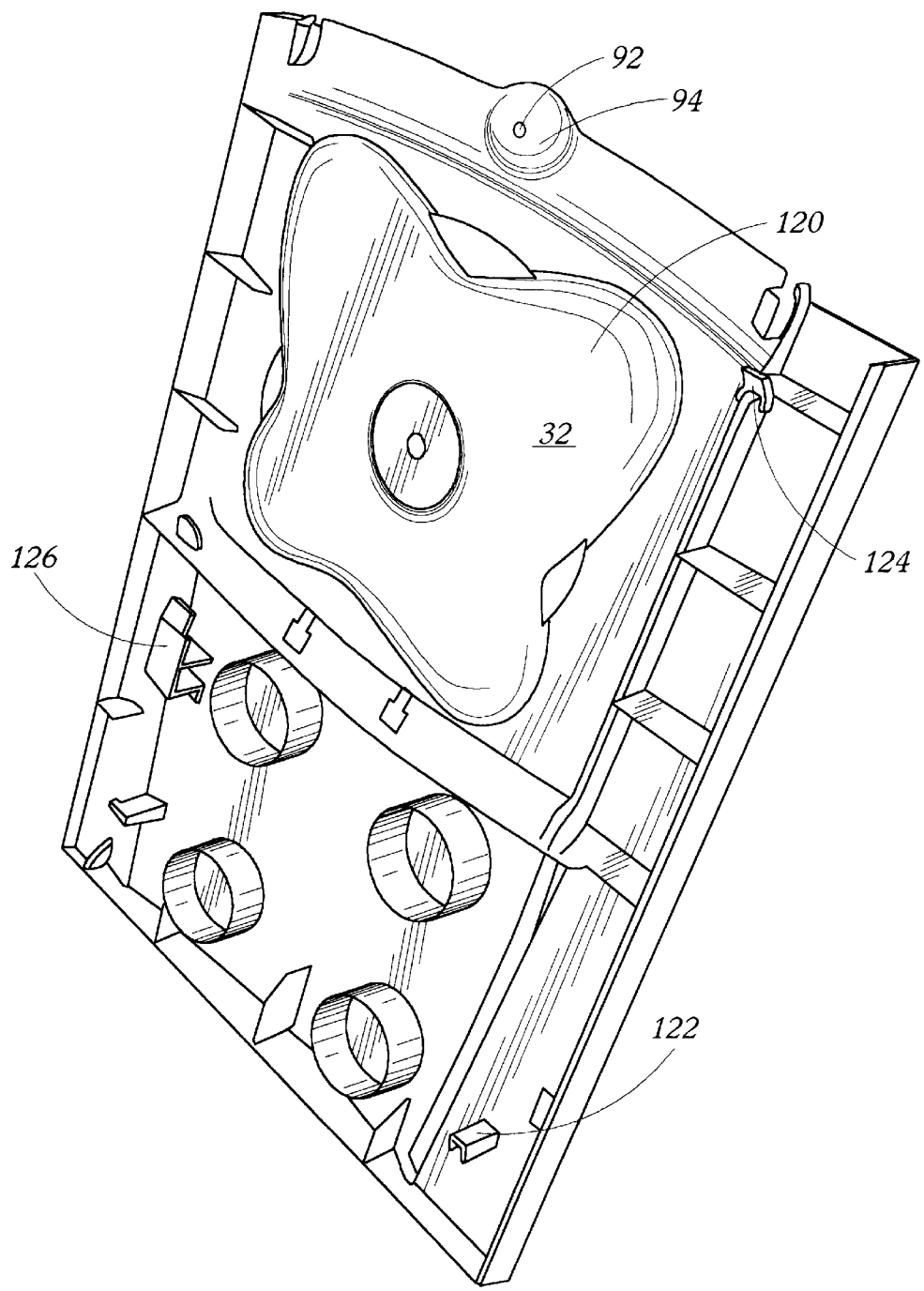
FIG. 12 is a bottom perspective view of a top panel member of the computer of FIG. 1.
Figure 13:
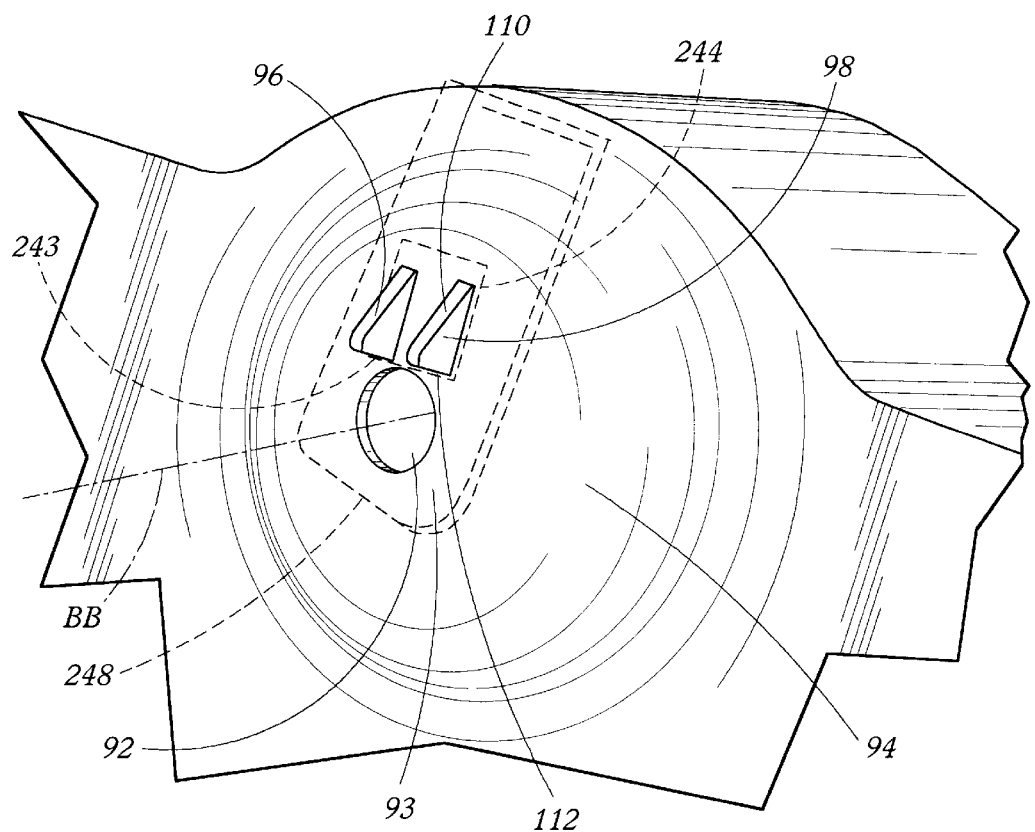
FIG. 13 is a detail view of a bottom portion of the top panel member shown in FIG. 12.

The door 50 may have a main body portion 72 and a front edge 74 and lateral side edges 76, 78 extending generally perpendicular thereto. The main body portion may have a depressed and cutout portion 80 therein which may serve as a finger-hold handle for raising and lowering the door 50. The door may have resilient outwardly projecting numbs 82, 84 provided on the side edge portion 76, 78 thereof which are adapted to act as detents which may be received in detent holes 86 (only one shown) at the lateral edges of recessed portion 42. This detent assembly 82, 84, 86, etc. serves to hold the door in a normally closed operating position illustrated in FIG. 1. The recess 42 and the door 50 are sized to provide a relatively close fit of the door within the recessed portion. As best shown in FIG. 3 the recess portion at a forward edge thereof has a depression or bowl 90 which may be, e.g., 20 mm in diameter, and which may have a depth of e.g., 7 mm. The bowl 90 in turn has a hole 92 centered therein and extending through the top plastic panel 32. FIG. 12 is a bottom view of top plastic panel 32 in which the portion corresponding to bowl 90 is a half dome 94 having hole 92 centered therein. FIG. 13 is a detail of the half dome 94 from which it may be seen that a pair of spaced apart wedge-shaped prongs 96, 98 project outwardly from the half dome 94. Each prong has a lower downwardly and rearwardly inclined ramp surface 110 and a vertically extending rear surface 112. It may be seen from FIG. 12 that the lower surface 120 of top plastic panel member 32 has a plurality of downwardly extending projections 122, etc. and locking tabs 124, 126, etc. adapted to snap lockingly fixedly secure the plastic top panel 32 to the top portion 128, FIG. 11, of housing 30. The various tabs and projections align the housing top portion with hole 92 thereof positioned directly above a point 130 on fixed front panel member 56, described below. Both point 130 and hole 92 are centered on vertical axis BB.

Front Panel Member

Figure 5:
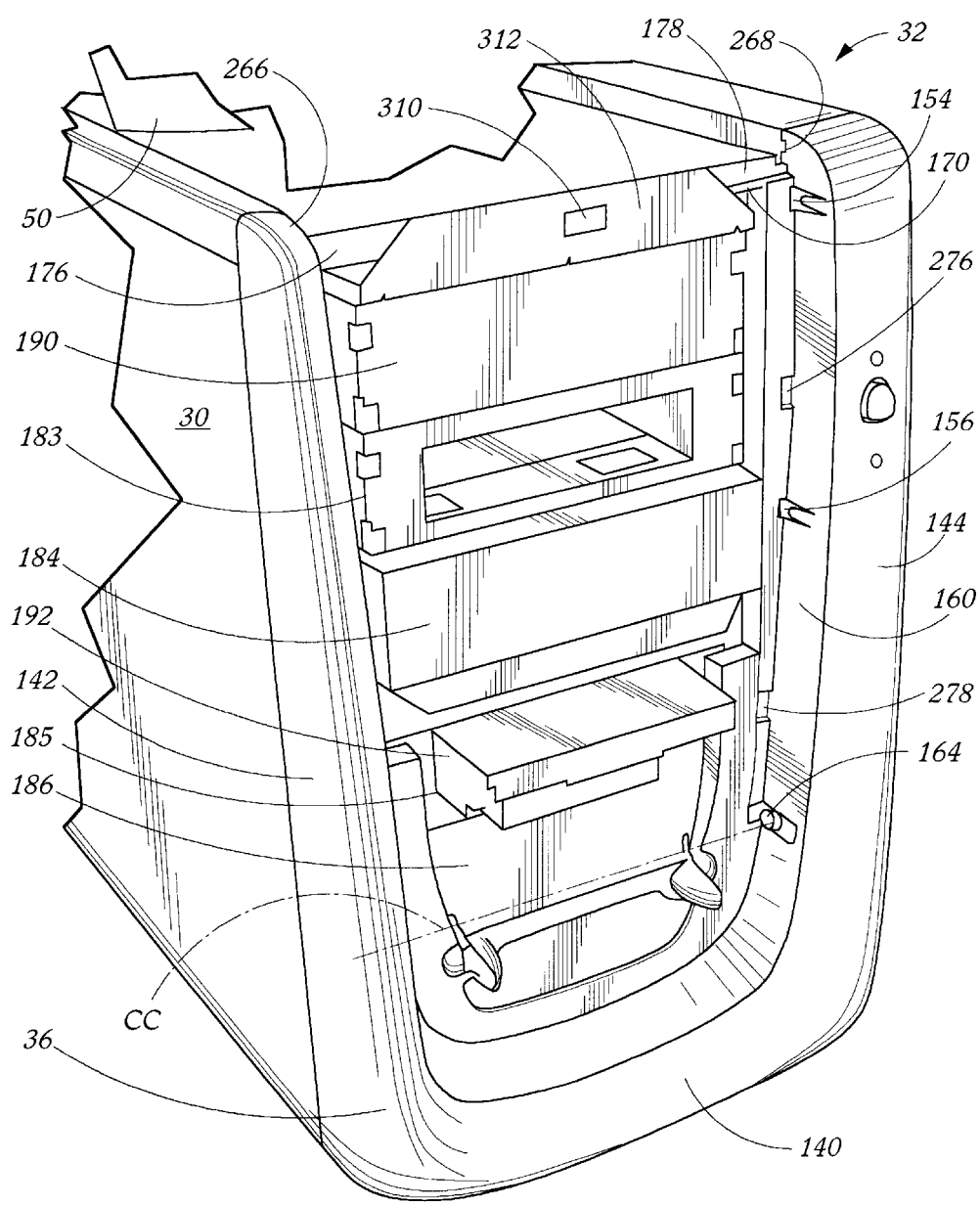
FIG. 5 is a perspective view of a front portion the computer of FIG. 1 with a front bezel member removed.
Figure 11:
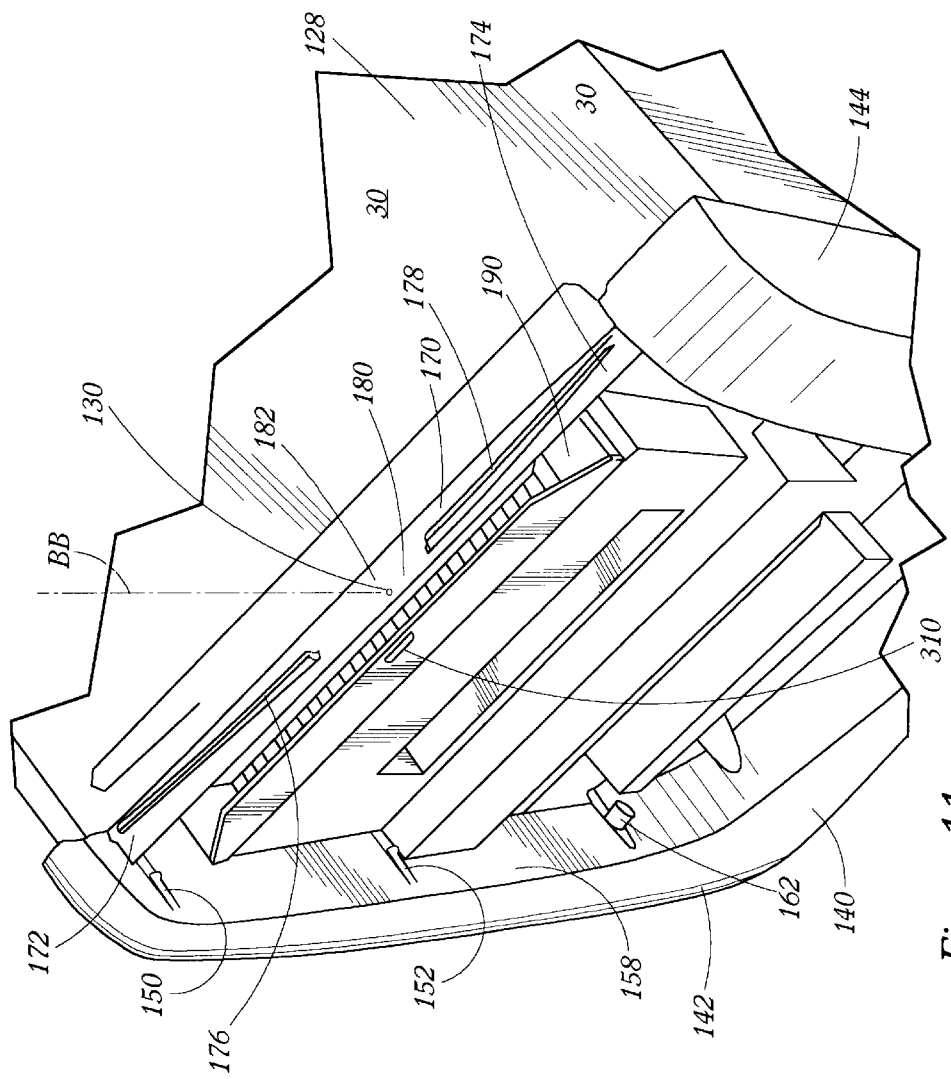
FIG. 11 is a top perspective view of a front portion of the computer of FIG. 1 with a top fixed panel assembly and a front bezel member removed.

Front plastic panel member 56, as best illustrated by FIGS. 1, 2, 5, and 11 is permanently fixedly mounted (i.e., it is not designed to be removed by a computer purchaser) on a front face portion of housing 30 as by snap-fit tabs on the panel member (not shown) received through cutouts (not shown) in the housing front face (not shown). The front panel 36 has a generally U-shaped configuration having a lower central body portion 140 integrally connected to left and right vertically extending arm portions 142, 144. Each of the arm portions, as best shown by FIGS. 5 and 11, have a plurality of deflectable detent members 150, 152, 154, 156 formed on inner vertically and longitudinally extending surface portions 158, 160 thereof. Each of these surfaces 158, 160 also has an inwardly projecting stud 162,164 provided in a lower surface portion thereof. The studs 162, 164 are coaxially aligned on horizontal axis CC. As best shown by FIG. 11 a resilient bridge member 170 has a first end portion 172 thereof attached to an upper end of the vertical arm portion 142 and a second end portion 174 thereof attached to an upper end of arm portion 144. As previously mentioned point 130 on the bridge member lies on vertical axis BB in alignment with hole 92 in upper panel member 32. Bridge member 170 has two vertically upright flange portion 176, 178 provided thereon which abuttingly contact the lower front edge surface of top plastic panel member 32 when it is mounted on the housing as illustrated in FIG. 5. The vertical flanges 176, 178 are separated at a central portion of the bridge member 170 by a gap 180 which enables dome portion 94 to project downwardly such that the bottom most surface 93 thereof (located at the periphery at hole 92) is positioned in near touching contact, e.g., 0 mm–3 mm, with a central flat surface 182 of the bridge member which contains point 130. Bridge member 170 is sufficiently flexible so that central portion 180 thereof may flex downwardly about 5 mm as the result of moderate downward force, e.g., 10 lbs., applied thereto at point 130.

There is sufficient distance between the bottom of bridge member 170 and drive assemblies 190, etc. positioned immediately below it to allow such downward flexing movement to occur.

The front panel member may also comprise a plurality of transverse portions 184, 186 defining openings 183, 185 in which other computer components such as drive assemblies, etc.,190,192 are supported.

Front Bezel Member

Figure 6:
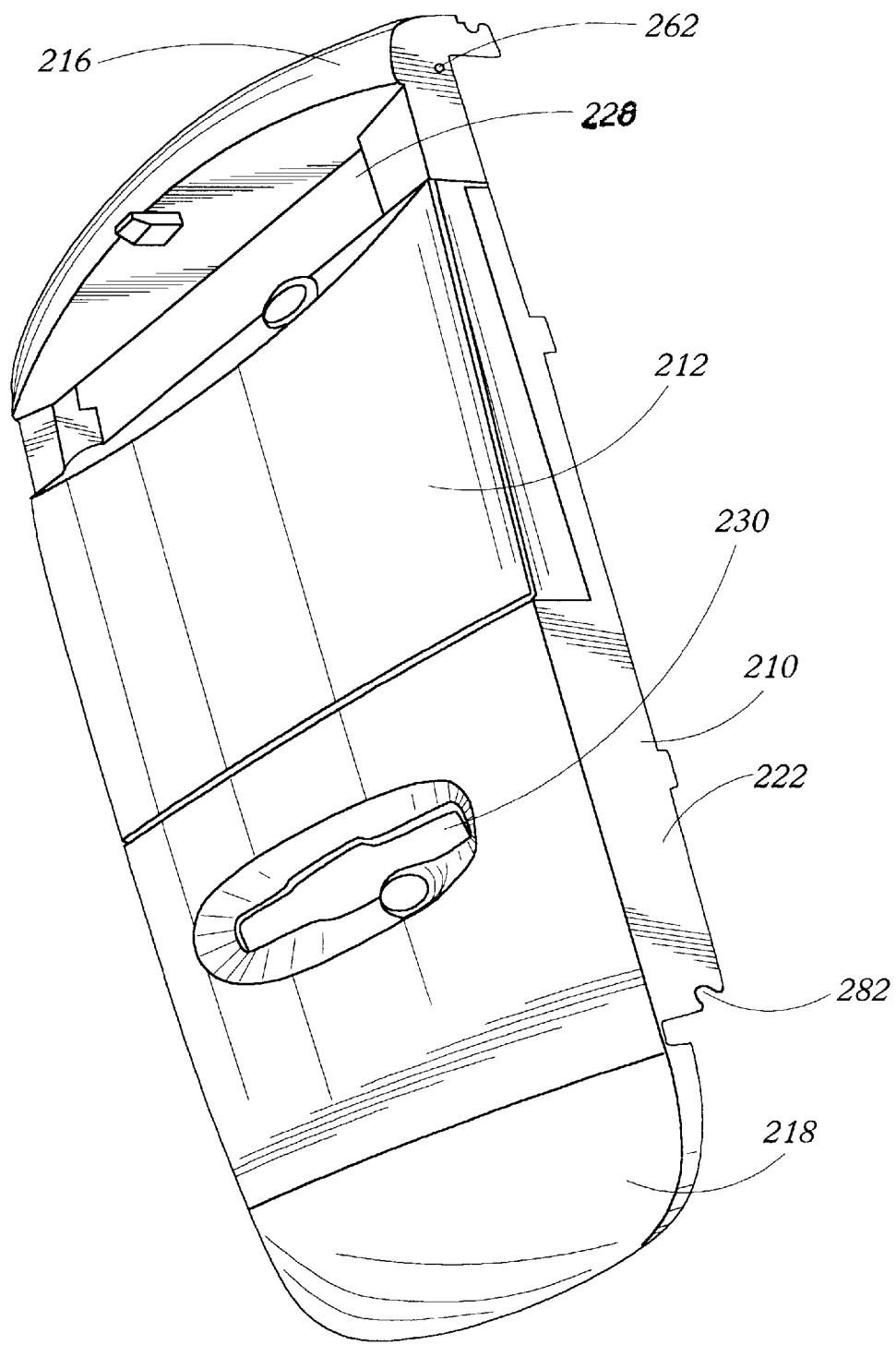
FIG. 6 is a front perspective view of a bezel member of the computer of FIG. 1.

A front bezel member 210, FIG. 6, is adapted to be readily replaceable with another bezel member 211 which may be of identical structure to bezel 210 but of a different color. Accordingly the bezel member shown in FIG. 6 is designated by both 210 and 211.

Figure 7:
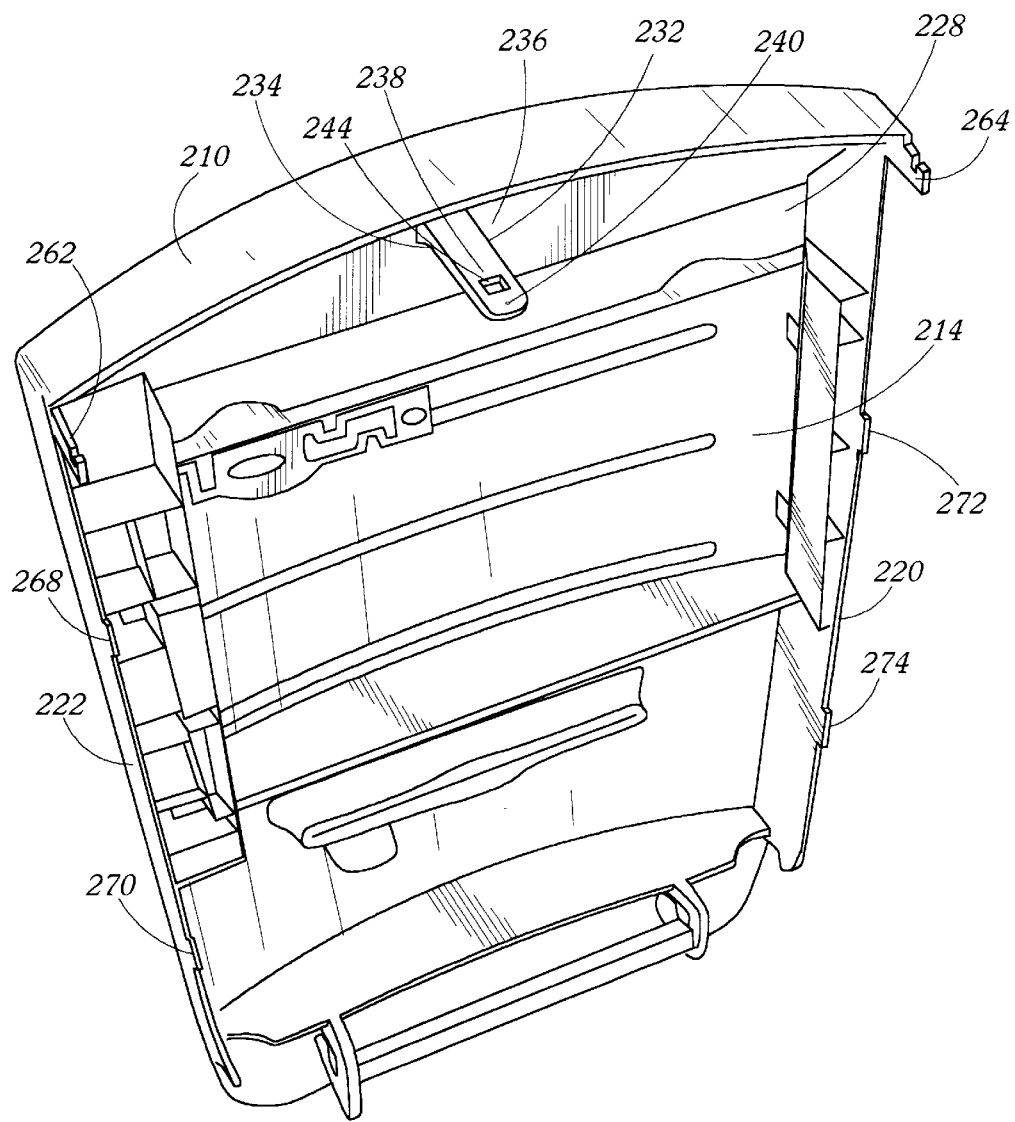
FIG. 7 is a rear perspective view of the bezel member of FIG. 6.
Figure 8:
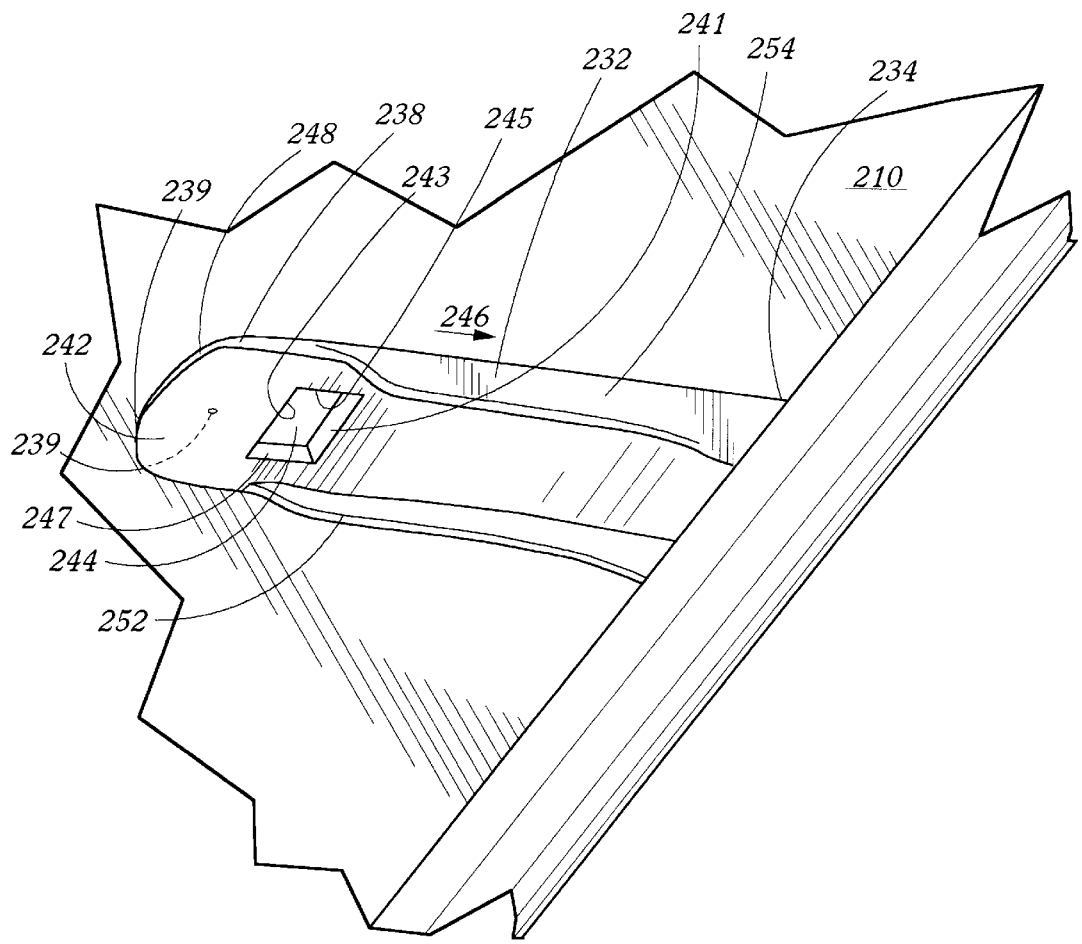
FIG. 8 is a detail perspective view of a portion of a front bezel latch assembly.

The inside surface of bezel 210 has an elongated latch member 232 extending rearwardly therefrom. The latch member 232 is a cantilever beam member, shown in greater detail in FIG. 8, having a first end portion234 fixedly attached to bezel rear surface 214 at an upper portion 234 fixedly attached to bezel rear surface 214 at an upper portion 236 of the bezel member which is positioned above cutout slot 228. The latch member 232 has a second or distal end 238 having an upper surface portion 240 which is adapted to be aligned at region 239 with vertical axis BB when the bezel 210 is mounted on the housing in the position illustrated in FIG. 1. The second end 238 also has a lower surface portion 242 positioned immediately below its upper surface portion 240. A rectangular cutout 244 is provided a short distance in the proximal direction 246 from the tip 248 of second end 238. The distance from the tip may be e.g., 7 mm. The cutout portion 244 has front, rear, left, and right annular wall portions 241, 243, 245, 247. The latch member 232 may have stiffening vertical flanges 252, 254 provided thereon at a postion endwardly of cutout 244. The latch member 232 is resiliently deflectable from the position illustrated in FIGS. 7 and 8 to a position with tip end 248 located a short distance, e.g., 5 mm downwardly from that illustrated in FIG. 8. Through application of moderate force e.g., 5 or 10 lbs. To upper surface portion 240. A central point 239 on upper surface 240 is adapted to be aligned with axis BB when the bezel 210 is in a latched position as shown in dashed lines in FIG. 13 and discussed in further detail below.

Figure 9:
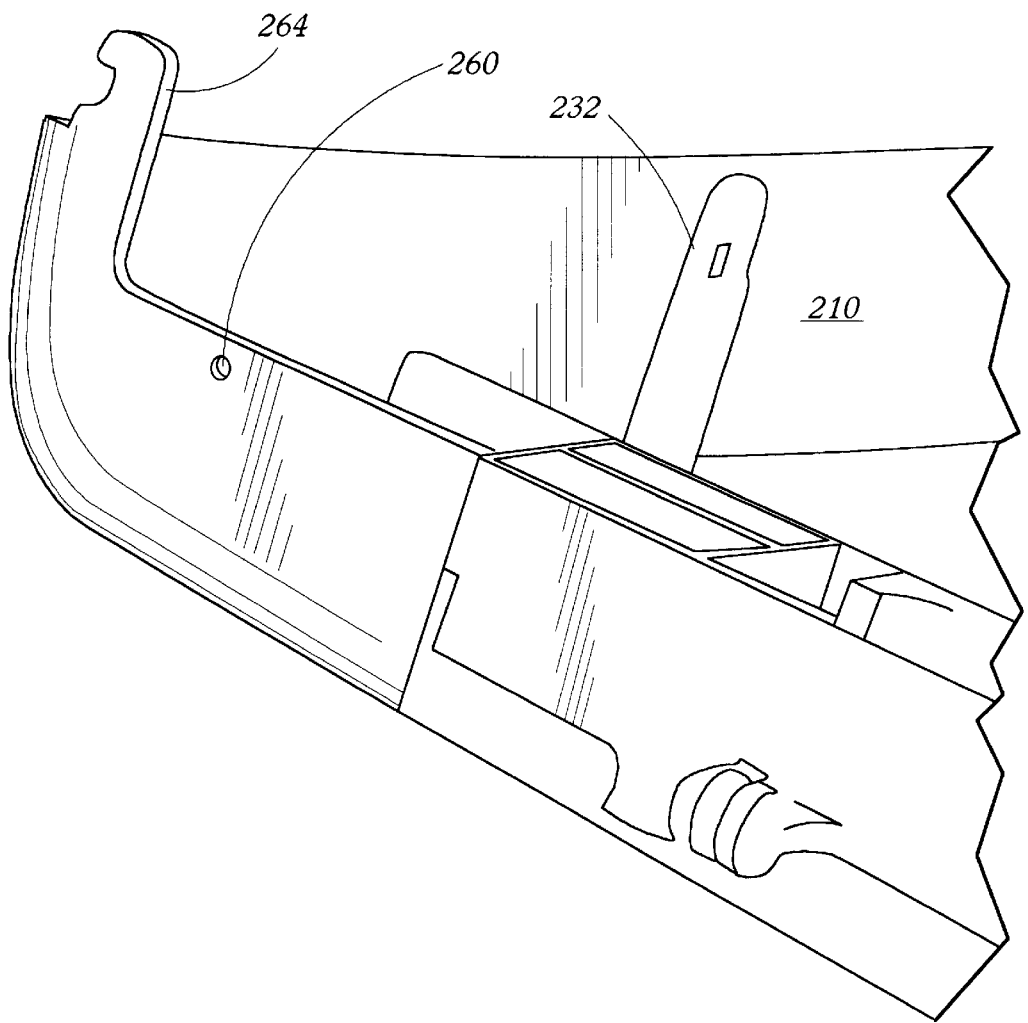
FIG. 9 is a detail perspective view of an upper corner portion of the bezel member.

As illustrated in FIG. 9 the front bezel left and right side wall flange portions 220, 222 may comprise detent holes 260, etc. therein adapted to receive associated detent portions 150, 152, 154, etc. to releaseable hold the bezel member 210 in fixed association with the front panel member 36. As also shown in FIG. 9 a top claw portion 262, 264 extends rearwardly from the top lateral side portion of the bezel member 210. The claw portions 262, 264 are adapted to be received in recessess 266, 268 provided in the front top portion to matingly engage a reciprocal claw portion 81, 83 provided at the lower front edge of the top door 50. The engagement of the reciprocal claw portions may be-released by lifting the top panel door 50, but as long as the door 50 is down the claw portions remain engaged preventing forward movement of the top portion of the front bezel 210. The front bezel 210 has a plurality of rearward projections 268, 270, 272, 274 adapted to be received in holes 276, 278, etc., of front panel 36, FIG. 5, to properly align the bezel 210 with the front panel 36.

The bezel member 210 also has downwardly opening, half moon shaped recesses in the lower portions of the side wall flanges 220,222 as shown at 282,284. The recesses 282,284 are adapted to be received on studs 162, 164 for vertically supporting bezel member 210 on the front panel 36 and for allowing pivotal displacement of the front bezel 210 about axis CC.

Operation

Figure 10:
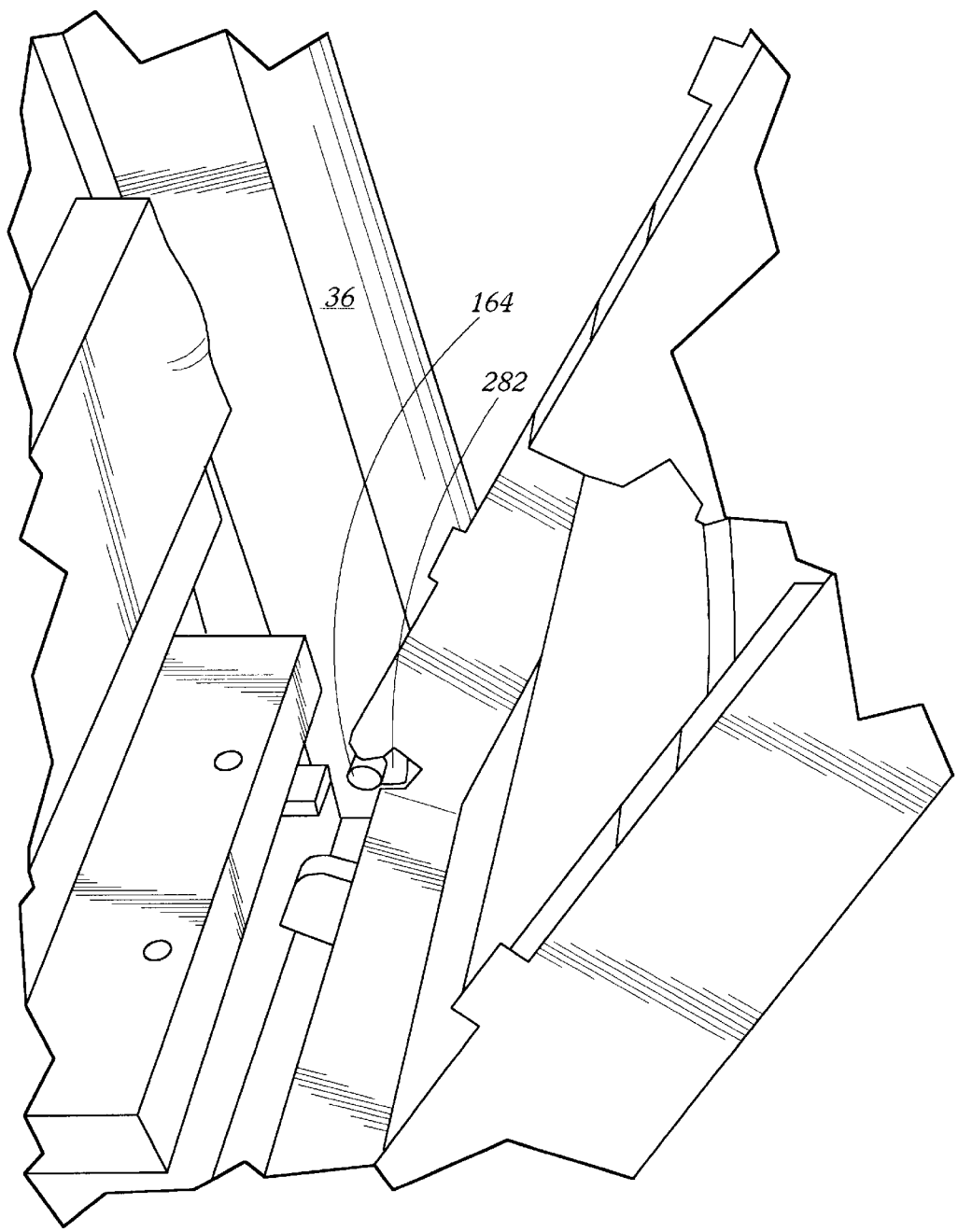
FIG. 10 is a perspective view of a front portion of the computer of FIG. 1 showing mounting of a bezel member thereon.

The operation of mounting a front bezel member 210 on front panel 36 begins, as illustrated in FIG. 10, by placing half moon recesses 282, 284 of the bezel member on studs 164 and 162 of the front panel member 36 with the bezel member 210 tilted away from the front panel 36 at an angle of between about 10 and 30 degrees. Next the top portion of the bezel member 210 is moved toward the top portion of the panel member 36 by rotation of the bezel member 210 about axis CC. This rotation about axis CC eventually brings latch member 232 to a point where the tip 240 thereof is positioned in alignment with a hole 310 in a vertically extending.face 312 of internal computer component 190 extending through opening 183 in front panel 36. The hole 310 is longitudinally (forwardly/rearwardly) aligned with the gap 180 in bridge member 170. Further rotational movement of the front bezel member 210 causes the latch member tip 248 to pass through opening 310 and through gap 180 and to engage a sloping forward surface of half dome 94. The engagement with half dome 94 causes tip 248 to be moved slightly downwardly. Further rotational movement of the bezel member 21 0 causes tip 248 to engage ramp surfaces 110 of wedge shaped prongs 96, 98 causing further downward deflection thereof. Still further rotational movement of bezel member 210 about axis CC causes the latch member cutout 240 to move into vertical alignment with the prongs which allows the latch member to resiliently deflect upwardly such that the upper surface thereof is in contact with the lower surface 93 of dome portion 94 as illustrated in phantom in FIG. 13. In this position the latch member 232 is in a "latched state" or "latched" and is prevented from moving longitudinally forwardly by the engagement of the rear surface 112 of the prongs 96, 98 with the annular wall surface 241 of the cutout.

The latch member 232 and other portions of the bezel member 210 and front panel member 56 and top panel member 32 are constructed and arranged such that when the latch member 232 is in the latched state the bezel member 210 is in the relatively rotated position with respect to front panel member 56 shown in FIGS. 1 and 2 with the various detents and detent holes 154, etc. and 262, etc. aligned and engaged.

To remove the bezel member 210 the top door 50 is opened exposing hole 92, FIG. 3. Next a small slender object such as a ball point pen, pencil, paper clip end or the like is inserted into the hole and pressed downwardly against the upper surface 240 of the latch member at 241. This downward pressure causes the latch member to deflect downwardly sufficiently so that it clears the prongs 96, 98. Next, while downward pressure is exerted on the latch member 232 the front bezel is grasped at the top and rotated outwardly or away from the front panel member (about axis CC) until the latch member 232 is completely outside of opening 310. Next, the front bezel may be lifted slightly to remove half moon portions 282, etc. from studs 164, etc. so that it now occupies the position shown in FIG. 10. Finally, it may be lifted and completely removed from the front panel.

As previously mentioned the top door 50 may be removed simply by rotating it past the open position shown in FIG. 2.

Thus, a computer is provided with two readily removable panel members 50, 210 (which may be a top door and front bezel) which may be replaced with other panel members of different colors to change the appearance of the computer 10.

While illustrative and presently preferred embodiments of the invention have been described in detail herein, it is to be understood that the inventive concepts may be otherwise variously embodied and employed and that the appended claims are intended to be construed to include such variations except insofar as limited by the prior art. For example, the door and front bezel member could be mounted directly on a sheet metal housing rather than interposed fixed plastic panel members; various latch assemblies and/or latch trip mechanisms may be employed; the top door may be eliminated or the access hole may be made large enough to, so that no tool is required, etc.

What is claimed is:

1. A method of replacing a computer front panel comprising:

pivotally lifting a computer top panel;

inserting an elongated tool into a hole in a portion of computer chassis exposed by lifting the top panel;

pushing the elongated tool against a deflectable member associated with the front panel;

pivotally displacing and liftingly removing the computer front panel;

placing a replacement front panel in engagement with a housing pivot structure;

pivoting the replacement front panel into latching engagement with the computer chassis.

* * * * *